United States Patent [19]
Mendel

[11] Patent Number: 5,401,454
[45] Date of Patent: Mar. 28, 1995

[54] EXTRUSION DIE AND METHOD OF CONTROLLING FLOW THROUGH THE DIE

[75] Inventor: Kilian K. Mendel, Wadsworth, Ohio
[73] Assignee: UC Industries, Inc., Parsippany, N.J.
[21] Appl. No.: 120,293
[22] Filed: Sep. 13, 1993
[51] Int. Cl.⁶ .............................................. B29C 47/16
[52] U.S. Cl. ................................. 264/176.1; 264/51; 264/177.16; 425/378.1; 425/382.3; 425/382.4; 425/466
[58] Field of Search .................. 264/176.1, 176.16, 51; 425/376.1, 461, 382.3, 382.4, 465, 466, 381, 378.1

[56] References Cited
U.S. PATENT DOCUMENTS

| | | | |
|---|---|---|---|
| 3,649,147 | 3/1972 | Fritsch | 425/382.3 |
| 3,694,120 | 9/1972 | Walton | 425/382.4 |
| 3,871,812 | 3/1975 | Phipps | 425/466 |
| 4,201,534 | 5/1980 | Phipps | 264/51 |
| 4,234,529 | 11/1980 | Phipps | 264/51 |
| 4,283,168 | 8/1981 | Miller et al. | 425/382.3 |
| 4,364,722 | 12/1982 | Phipps | 425/466 |
| 4,413,973 | 11/1983 | Peters | 425/382.3 |
| 4,445,837 | 5/1984 | Cisar | 425/466 |
| 4,536,357 | 8/1985 | Hayashi et al. | 425/461 |
| 4,789,513 | 12/1988 | Cloeren | 425/382.4 |

*Primary Examiner*—Jeffery R. Thurlow
*Attorney, Agent, or Firm*—Renner, Otto, Boisselle & Sklar

[57] ABSTRACT

An extrusion die and flow control method incorporates a flow control in the form of a flow diverter which extends transversely across the flow path. The diverter forms part of a window upstream of the die lips and provides a slight tapering enlargement which may be moved along the window across the flow path from one side to the other or preferably, from the center symmetrically outwardly, or vice versa, to divert flow from the center proportionally to the edges without changing the total cross sectional area of the window. The window is formed by a pair of axially rotatable cylindrical bars recessed in the die body which each have a flat forming the enlargement. In the preferred form the flat is helical. The helical flats are opposed or matched so that as the bars contra-rotate synchronously the enlargement will move across the window. Where the movement is symmetrical from the center or axis to each transverse edge and vice versa, the helical matching flats on each bar turn in opposite directions on each end of the middle of each bar. Where the enlargement simply moves from one transverse end of the window to the other the turn of the helix of each flat is the same from end to end of the bar, although for each of the pair, in the opposite direction. Movement of the enlargement across the flow path is obtained by axial rotation of the bar. Tandem pairs of bars may be used separately or in conjunction with each other, and may have axially inclined flats.

47 Claims, 5 Drawing Sheets

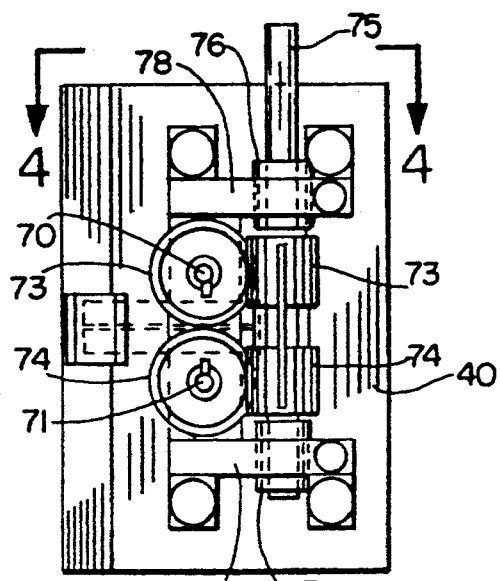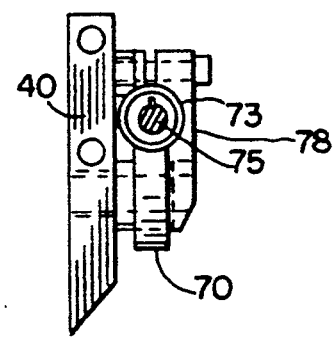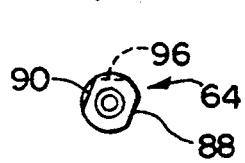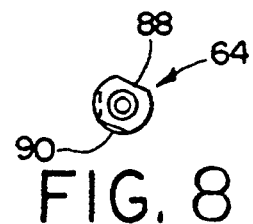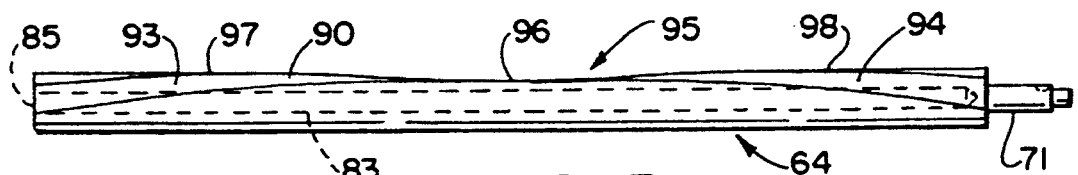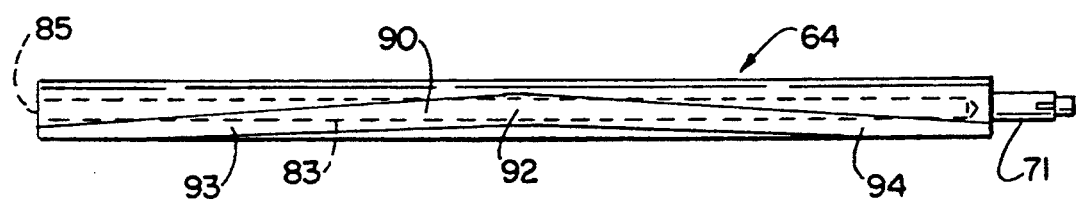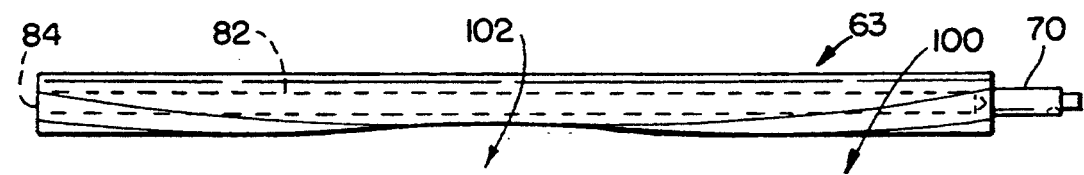

EXTRUSION DIE AND METHOD OF CONTROLLING FLOW THROUGH THE DIE

This invention relates generally as indicated to an extrusion die and also to a method of controlling flow through the die, which flow in turn affects the shape or profile of the item being extruded.

BACKGROUND OF THE INVENTION

In the extrusion process a plastic or resin melt is formed under heat and pressure. The melt is usually formed continuously by a rotating screw in a barrel which converts solid pellets of the resin or plastic into the flowable melt. A wide variety of additions may be incorporated into the melt such as extenders or blowing agents for foam products. The nozzle of the extruder is of necessity restricted to create the required high pressure. From the nozzle the melt flows through a pipe into the die which usually includes a plenum chamber expanding to the width of the die opening. The relatively wide die opening may have adjustable die lips as in a sheet, film or board die, or it may have a series of equal circular fixed openings as in a strand die. The dies themselves are heated or cooled and may have straight, circular, or arcuate die openings. Moreover, the die openings may not be uniform across the die lips. One such die, known as a bow-tie die, is illustrated in U.S. Pat. No. 4,364,722. Other such dies are illustrated in prior U.S. Pat. Nos. 3,871,812 and 4,201,534.

One of the major problems in extrusion is to achieve complete homogeneity of the melt. This is difficult to do, particularly with regard to temperature homogeneity. Temperature, of course, affects viscosity. Even if uniform viscosity is achieved at some point in the process, it may be lost before the extrudate exits the die lips. The lower the viscosity, the faster the flow rate, and the more difficult it is to control volume throughput and the shape or profile of the product being formed. The problem is complicated by the configuration of the die. The flow path for the extrudate is not in every instance identical. For example, with fan-shape or coat hanger dies having arcuate adjustable die lips such as shown in the noted prior patents, it has been found that higher viscosity or flow is usually experienced at the center of the die with the die lips in an adjusted position. This, of course, makes the product such as a foam board, bulge in the middle. To remedy this situation, the die lips need to be readjusted to be brought closer together at the center and spread further at the lateral ends or edges. This must be done with multiple adjustments which are made even more difficult by the fact that the die may be inside a vacuum chamber. Since the die lip adjustment is preferably a vernier dial or fine adjustment, it takes longer to achieve, resulting in more out of tolerance product and removal of the die lips from an ideal setting for a given product. It would be preferable if the excess throughput at the center of the die could be corrected symmetrically by a gross adjustment without moving the die lips from an ideal setting for a given product.

In some relatively wide dies internal choker bars have been employed to achieve some form of adjustment apart from the die lips. These bars are somewhat flexible or distortable and are usually supported by a plurality of adjustment screws. By manipulation of the screws the profile of a window or opening within, the die may be controlled. Each screw has to be extended locally to restrict the opening or retracted locally to enlarge the opening. Without very expensive drives or controls, it is impossible to shift an enlargement or restriction in the window laterally of the extrudate path and substantially maintain the cross sectional area of the window. This is especially true if the enlargement or restriction is to be divided and moved symmetrically from the center to the ends or edges, or vice versa.

Also, a common form of flow control is to machine a diversion delta or control into a plenum of a die body or part, and then replace that body or part when the parameters change. Die changes in a large extrusion line are, needless to say, costly. It would accordingly be desirable to duplicate numerous types of die plenums with a simple adjustment.

It is also desirable to have a simple gross adjustment within the die, apart from the die lips, which will form an enlargement in a window within the die and enable that enlargement to be moved transversely of the flow path for the extrudate along the die lips, whether from one end to the other, or preferably, symmetrically from the center to the edges and vice versa. It would also be desirable that such gross adjustments be made quickly and conveniently from a single point or power source. It is also desirable that the ability to make such adjustments be accomplished without sharp profile or significant pressure drops within the die, which in a foam process may result in premature foaming within the die.

SUMMARY OF THE INVENTION

An extrusion die and flow control method incorporates a flow control in the form of a flow diverter which extends transversely across the flow path. The diverter forms part of a window upstream of the die lips and provides a slight tapering enlargement which may be moved along the window across the flow path from one side to the other or preferably, from the center symmetrically outwardly, or vice versa, to divert flow from the center proportionally to the edges without changing the total cross sectional area of the window. The window is formed by at least one axially rotatable cylindrical bar recessed in the die body which has a flat forming the enlargement. In the preferred form the flat is helical. Movement of the enlargement across the flow path is obtained by axial rotation of the bar.

In the preferred form two opposed parallel bars are provided forming the long or transverse edges of the window which may normally be rather wide and narrow. The width may correspond to the width of the die lip opening, or be symmetrical therewith about the machine direction or extrusion axis. The helical flats are opposed or matched so that as the bars contra-rotate synchronously the enlargement will move across the window. Where the movement is symmetrical from the center or axis to each transverse edge and vice versa, the helical matching flats on each bar have a turn or twist in opposite directions on each end of the middle of each bar. Where the enlargement simply moves from one transverse end of the window to the other the turn of the helix of each flat is the same from end to end of the bar, although for each of the pair, in the opposite direction.

The helical flats have a relatively small helix angle so that the enlargement moves its entire extent along the window upon relatively little of rotation of the bar. The circular bars are recessed within the die body in circular slots to project only slightly into the plenum of the die. Each bar may also be provided with a linear flat which forms a linear continuation of the plenum in one rotational position of the bar. The bar then is effectively recessed from the plenum. Each bar may be axially hollow to accommodate an electrical heater to facilitate rotation and not adversely affect viscosity. A plurality of pairs of bars may be positioned in tandem in the plenum to be used concurrently or separately as a gross flow control in the die. The tandem pairs may be used separately or in conjunction with each other to obtain a variety of controls. Especially useful with the tandem arrangement are bars with inclined flats.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 3 is a somewhat enlarged side elevation of the flow control drive at one side of the die;

FIG. 4 is a section transversely of the single drive point as seen from the line 4—4 of FIG. 3;

FIG. 5 is a side elevation of one of the rotatable flow control bars of the die illustrated in FIGS. 1 and 2;

FIG. 6 is an end view of the bar seen from the right hand end of FIG. 5;

FIG. 7 is a top plan view of the bar of FIG. 5 seen from the top thereof;

FIG. 8 is an end view of the bar of FIG. 7 seen from the right hand end thereof;

FIG. 9 is an elevation of a pair of bars such as shown in FIGS. 5 and 7 forming the transverse edges of the window and showing the enlargement in the center of the window;

DETAILED DESCRIPTION OF THE PREFERRED EMBODIMENTS

Figure 1:
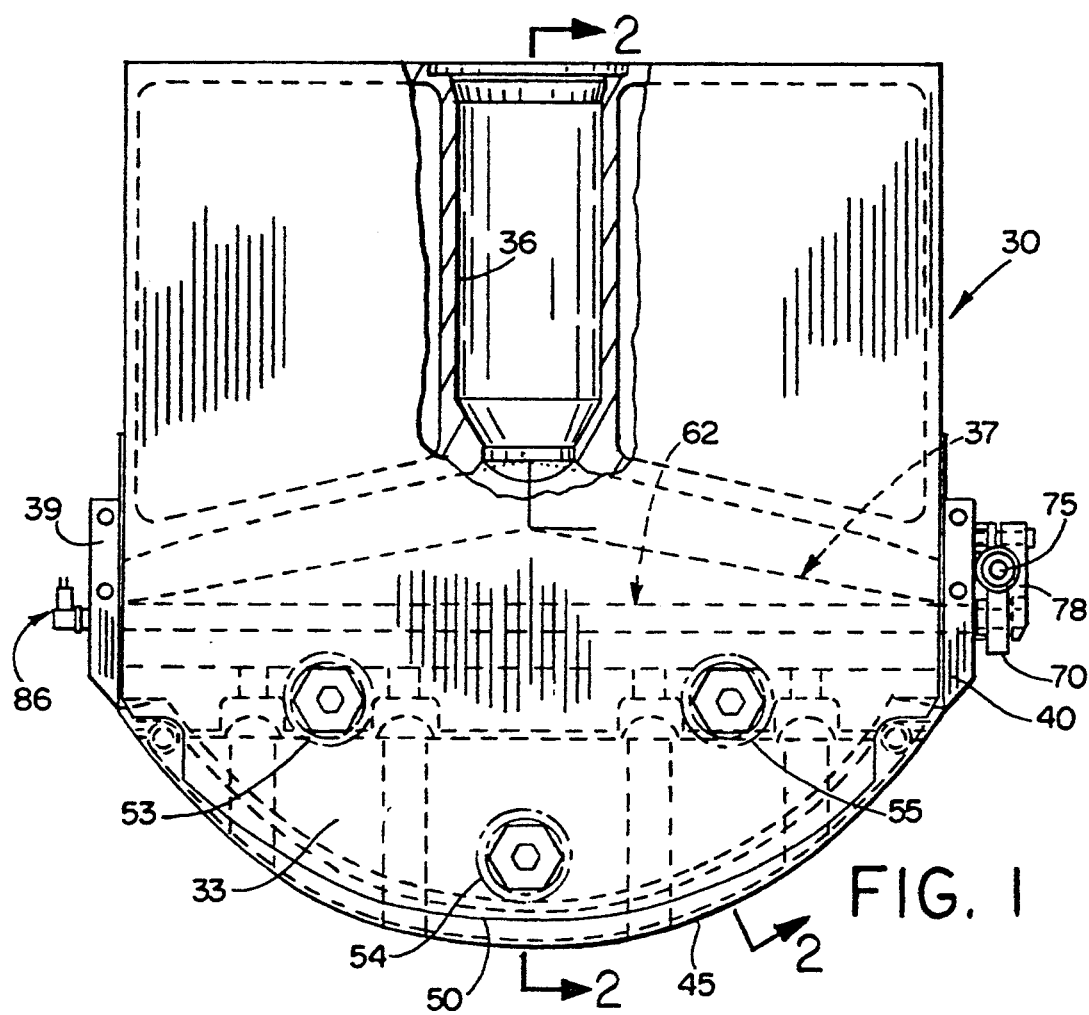
FIG. 1 is a top plan view partially broken away and in section of a die in accordance with the present invention.
Figure 2:
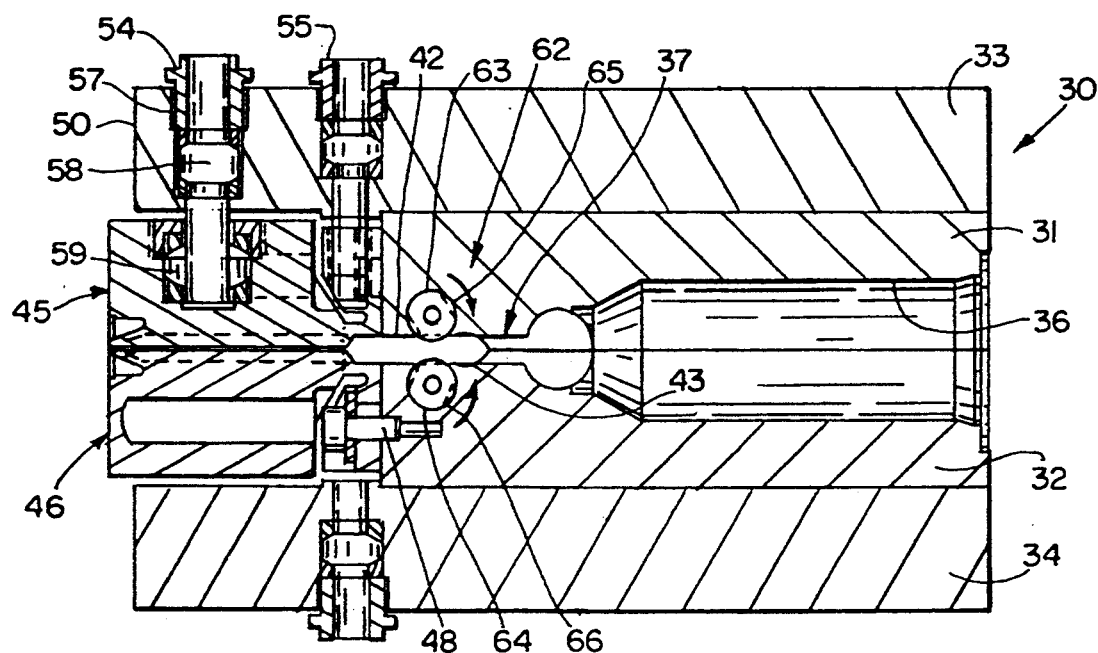
FIG. 2 is a vertical section of the die of FIG. 1 taken on the lines 2—2 of FIG. 1.

Referring initially to FIGS. 1 and 2, there is illustrated an extrusion die shown generally at 30. The die comprises an upper die body 31 and a lower die body 32, which parts are clamped between upper retainer 33 and lower retainer 34. It will be appreciated that the clamp fasteners and various oil heating passages which extend through the die body parts are not illustrated. The upper and lower die bodies form a sizable inlet indicated at 36 which extends into a coat hanger-shaped plenum indicated generally at 37. The plenum is closed at the transverse edges by end caps 39 and 40. The plenum also has horizontal top and bottom walls indicated at 42 and 43 which between the end caps provides a relatively wide and vertically narrow chamber for the plenum. The chamber is elongated in the horizontal or transverse direction, sometimes referred to as the Y axis. The chamber is relatively narrow in the vertical or Z axis direction. The machine direction or machine axis is sometimes referred to as the extrusion axis or the X axis. The chamber 37 communicates with a similar chamber between the upper die lip 45 and the lower die lip 46. The flexible die lips 45 and 46 are mounted to the front of the die body parts 31 and 32 by the fasteners indicated at 48. Further detail of the construction and mounting of the die lips may be seen in the noted prior U.S. Pat. No. 4,364,722.

As seen, the upper and lower retainers project beyond the die body parts to extend above and below the die lips 45 and 46, respectively. The front edge of the upper and lower retainers is arcuate as indicated at 50, as is the front edge of the die lips. The cantilevered forward extensions of the die retainers each support three die adjustments, the upper adjustments being seen at 53, 54, and 55. The adjustments are obtained by hollow externally geared nuts threaded in the retainers as seen at 57. The nuts bear on adjusting bolts 58 which are threaded within spherical adjusting nuts 59 secured by the spherical washer assembly illustrated in the die lip. The rotation of the nuts from a remote location may be used to bring the die lips closer together, when tightened, or further apart when loosened with the pressure of the melt separating the flexible die lips.

Reference may be had to prior patents U.S. Pat. No. 4,211,739 and 4,234,529 for the environment of a foam board die as one of a number of applications in which the present invention may be utilized. As indicated, the adjustment of the die lips is rather complex having a least six adjustment points, three at the top and bottom, although additional adjustment points may be provided. The adjustment of the die lips for a given product parameter is designed to control the flow through the die lips which in turn controls the shape or profile of the product. Because of the problem of experiencing excess throughput or flow in the center of the die lip opening, there is provided a gross flow adjustment shown generally at 62. The gross adjustment comprises circular cylindrical bars 63 and 64 mounted in circular cylindrical recesses 65 and 66 in the upper and lower die bodies 31 and 32, respectively. As illustrated, the circle of the cylindrical bars projects only slightly into the plenum. The cylindrical bars form the parallel long dimensions of a relatively narrow rectangular window which extends transversely of the machine direction. In the die illustrated, the window has the same width as the transverse width of the die opening. The window should, at least, be symmetrical with the die opening about the machine axis.

As indicated in FIG. 9, each bar 63 and 64 has a reduced diameter projection on one end as seen at 70 and 71, respectively. As seen in FIG. 3, the projections are keyed to helical gears 73 and 74, respectively, mounted on outside of end cap 40. The gears are driven by respective right and left-hand worms 73 and 74 mounted on shaft 75. Rotation of the shaft 75 will drive the gears and thus the cylindrical bars in opposite directions of rotation. The shaft 75 is mounted in bushing 76 and 77 secured by respective brackets 78 and 79 to the exterior of the end cap 40. The motor drive for the shaft 75 may be located remotely from the die. The shaft and motor constitute a single point adjustment for the cylindrical bars.

Referring again to FIG. 9, it will be noted that each cylindrical bar 63 and 64 has a hollow or open interior seen at 82 and 83, respectively, which opens at the ends 84 and 85 opposite the drive connections 70 and 71. Electrical heaters may be positioned inside the hollow interior of each cylindrical bar and the electrical connection 86 for such heaters is seen in FIG. 1 on the exterior of the end cap 39.

The bars 63 and 64 are a mirror image of each other and only the bar 64 is described in detail as illustrated in FIGS. 5–8. When comparing FIGS. 5 and 7, it is important to note that the top plan view of FIG. 7 is as though the bar of FIG. 5 has been rotated 90° about its axis with the top moving toward the viewer. In comparing FIGS. 6 and 8, the bar itself has rotated 90° in a counter clockwise direction from FIG. 6 to FIG. 8.

It will be seen that the bar has two flats which extend from end to end. One flat shown at 88 in FIGS. 6 and 8 is linear and does not axially twist. In one position of rotation of the bar the flat can be aligned with the surface of the plenum 37 so that no portion of the bar projects into the plenum.

The other flat is indicated at 90 has a turn or twist in one direction to the midpoint 92 of the bar and then turns or twists in the opposite direction. The flat is, of course, symmetrical with respect to the midpoint of the bar and each end of the flat has a very low but opposite helix angle. The oppositely twisting ends of the flat on each side of the midpoint are shown at 93 and 94.

The flat 90 in its illustrated configuration then provides a profile deviation in the form of a depression shown generally at 95. The depression in the profile along the top of FIG. 5 can thus be seen by viewing the top edge of the bar from the right or lefthand side of the sheet. The depression has its deepest point at the center 96 and extends from the point 97 on the left-hand side of the view to the point 98 on the right-hand side. When the bar has been rotated 90° with the top moving toward the viewer as seen in FIG. 7, the depression has disappeared from the edge. The depression is a very gradual tapering depression formed by the helix of the flat. As an example, the bar may be approximately 1.125 inches in diameter while the flat 90 is 0.10 inches deep.

When the two bars 63 and 64 are positioned as seen in FIG. 9 to form the window 100 therebetween, the helical flats 90 of each bar will form an enlargement in that window as seen at 102. The enlargement 102 is then centered and symmetrical with the machine axis which runs through the center of the die.

Figure 15:
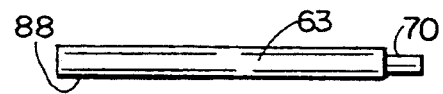
FIGS. 15 through 18 are schematic sequential views foreshortened and somewhat exaggerated illustrating various rotational positions of the bar set seen in FIG. 9 progressing from the bars in a retracted position to the enlargement in the center, to the enlargement moving symmetrically to the ends, and finally at the ends.
Figure 16:
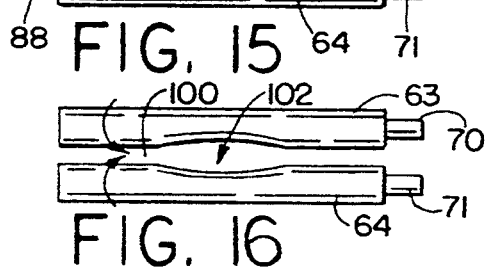
Figure 17:
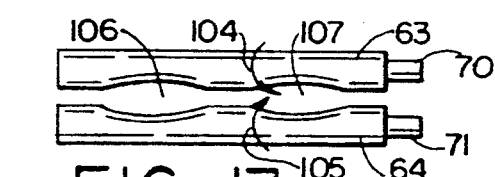
Figure 18:
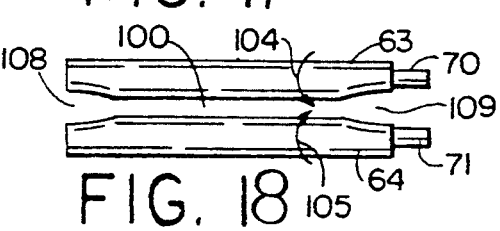
Figure 19:
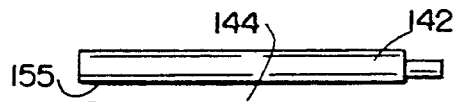
FIGS. 19–22 are schematic sequential views foreshortened and somewhat exaggerated illustrating various rotational positions of the bar set seen in FIG. 14 progressing from the bars in a retracted position, to the enlargement at one end, the enlargement in the middle, and finally at the opposite end.

Referring now additionally to FIGS. 15–18, it will be seen that by contra-rotating the bars, in the direction of the arrows indicated in FIGS. 16, 17 and 18, the enlargement is divided equally and moved to the outer extremities of the window. In FIG. 15, the linear flats 88 are opposite each other and flush with the wall of the plenum so that the bar does not project at all into the plenum. In FIG. 16, the bars have been rotated to form the enlargement 102 in the center of the window on the machine axis. Continued rotation of the bars in the directions of the arrows 104 and 105 causes the enlargement in the window 100 to divide into the two enlargements seen at 106 and 107. Continued rotation in the direction of the arrows 104 and 105 causes the enlargements to move to the extremities of the transverse window 100 as seen at 108 and 109 in FIG. 18. Continued rotation in the opposite directions as shown will cause the enlargement to disappear altogether. It is noted in moving from the FIG. 16 to the FIG. 18 position, where the opposed helical flats have gone from the center to the edges of the window, the bars have only rotated only 68°. Accordingly, by rotating the bars through a relatively small arc, the enlargement moves from the center to the extremities in the window uniformly and symmetrically.

Figure 10:
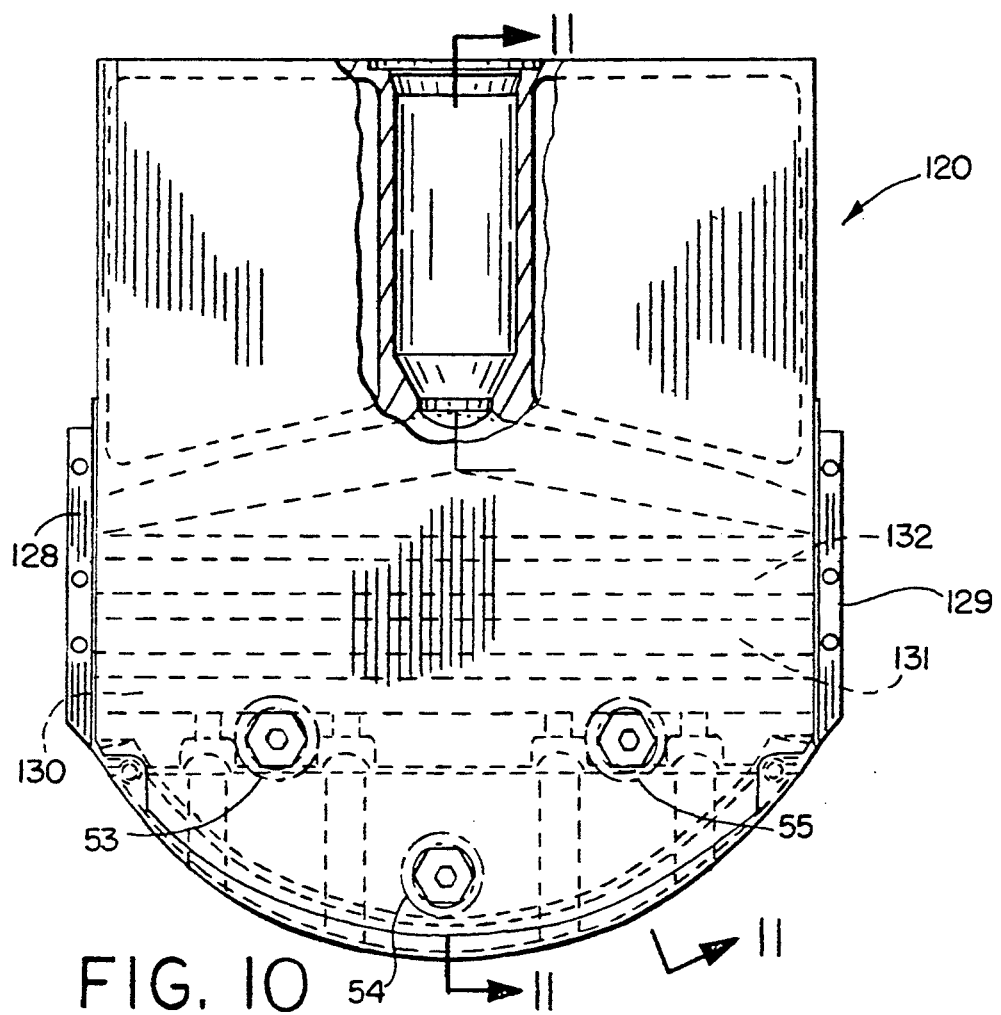
FIG. 10 is a top plan view of a die similar to that shown in FIG. 1, but illustrating three sets of flow control bars in the die.
Figure 11:
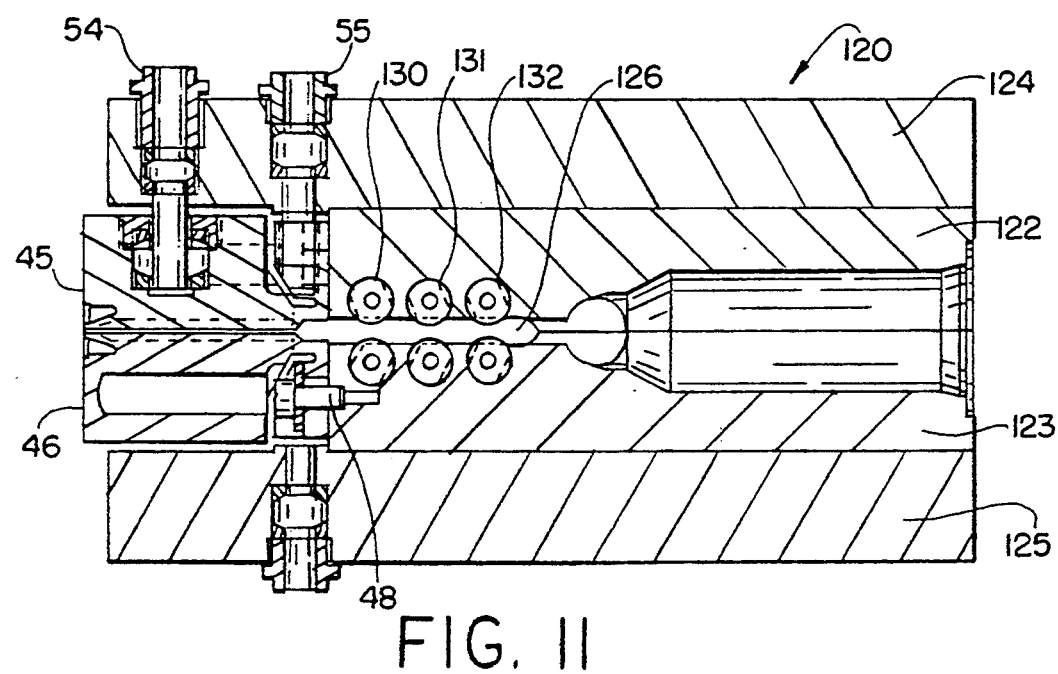
FIG. 11 is a view similar to FIG. 2, but taken on the lines 11—11 of FIG. 10 illustrating such tandem arrangement.

Referring now to FIGS. 10 and 11, there is illustrated a die assembly 120 which is in most respects identical to the die assembly 30 seen in FIGS. 1 and 2. The upper and low die bodies 122 and 123 have been somewhat elongated as have the upper and lower retainers 124 and 125, to form a plenum 126 which is elongated in the machine direction or X axis. The end caps 128 and 129 are also somewhat elongated.

The reason for the elongation of the plenum 126 is to provide tandem flow control bar sets as seen generally at 130, 131 and 132. The bar sets are mounted for contra-rotation in the identical manner as the flow control described above. Each bar of each set has a linear flat enabling the bar to be positioned to be flush with the plenum surface. Also, each bar may have a different configuration of flat or flats to enable the bar sets to be operated in conjunction with each other or individually to obtain a variety of flow control characteristics.

Referring now to FIGS. 12, 13, 14 and 19–22, there is illustrated another form of bar with a helical flat and the pairing of bars with a mirror image of the flat in order to form a flow control where the enlargement in the window may be moved from one end of the window to the other, but not to both and symmetrically.

Figure 12:
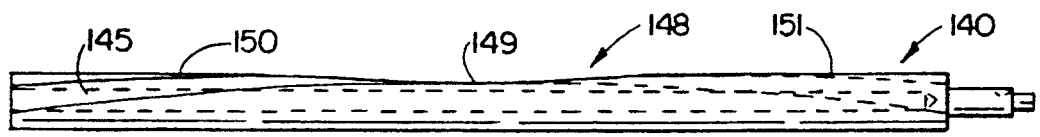
FIG. 12 is a side elevation of another form of bar.
Figure 13:
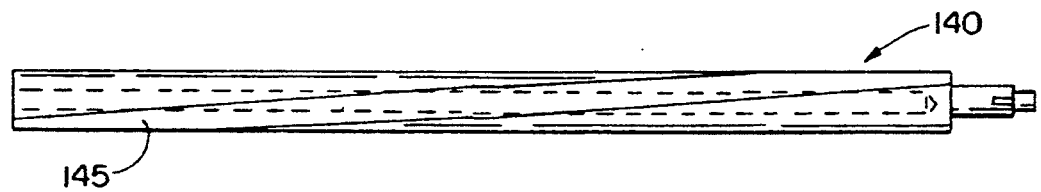
FIG. 13 is a top plan view of the bar of FIG. 12.
Figure 14:
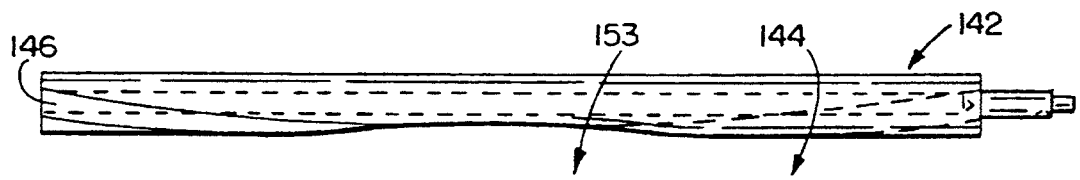
FIG. 14 is a view similar to FIG. 9, but illustrates a pair of bars such as shown in FIGS. 12 and 13 forming the transverse edges of the window.

Referring initially to FIG. 14, it will be seen that the opposed bars 140 and 142 form a window 144 therebetween. Each bar is provided with a helical flat as seen at 145 and 146, respectively. The helix of each flat has the same low helix angle as in the FIG. 7 embodiment, but instead of changing its direction of twist or turn, at the center or midpoint of the bar, the helix angle continues from one end to the other of the bar. As seen in FIG. 12, the flat 145 forms a depression 148 in the profile symmetrically to each side of the center of the depression. The depression extends from the center 149 to the ends 150 or 151. Again by rotating the bar the profile depression will move from one end to the other of the edge of the bar. When the opposed bars with the mirror image flats 145 and 146 are positioned to form the long edges of the window 144, and in the position illustrated an enlargement 153 is formed in the center of the window. With the bar and flat dimensions the same, the window 153 is identical in configuration to the window 102 seen in FIG. 9. However, when the bars 140 and 142 are contra-rotated synchronously, the enlargement will move across the window, but not divide and move symmetrically. Accordingly, the enlargement 153 may be placed in the center or anywhere along the length of the window.

Because of the reversal of the turn at the midpoint of the bar of the flats of the FIG. 9 embodiment, the total arc of the circle of the cylindrical bar taken up by the flat is only 68°. Because the helix continues in the FIG. 14 embodiment, the total arc taken up by the helical flat is twice that or 136°. Thus the bars 140 and 142 need only be rotated 136° to move the enlargement from one end or extreme of the window to the other. In the embodiment of FIG. 14, the angle of adjustment is still less than 180° while the angle of adjustment in the FIG. 9 embodiment is less than 90°, and well less than 75°. In both helical flat embodiments illustrated the helix angle is slightly less than 5°, and it is preferred to be less than 10°.

Figure 20:
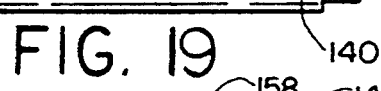
Figure 21:
Figure 22:
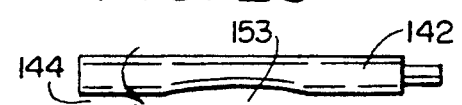

The bars 140 and 142 are also provided with a linear flat opposite the helical flat. Again, the linear flat is designed to bring the surface of the bar flush with the wall of the plenum. Such linear flats are illustrated at 155 and 156 in FIG. 19. In such Figure the flow control bars are effectively retracted. However, contra-rotation of the bars as indicated by the arrows 158 and 159, will cause the enlargement 153 to appear first at one end of the window as indicated in FIG. 20. Continued rotation in the direction of the arrows causes the window enlargement to move to the center as seen in FIG. 21 and finally to the opposite end as seen in FIG. 22.

Figure 23:
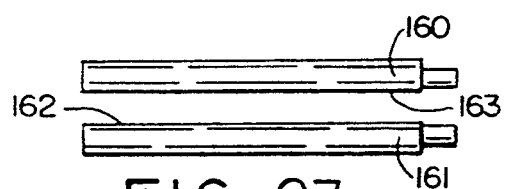
FIGS. 23 and 24 are similar schematic views of a set of bars having a linear flat on one side and parabolic or axially inclined flats on the other, the bars of FIG. 24 being contra-rotated from the position of FIG. 23.
Figure 24:
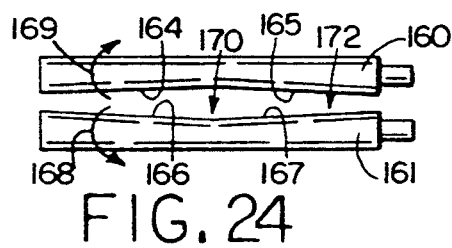

In FIGS. 23 and 24 there is illustrated another embodiment of the invention. The bar set indicated at 160 and 161 is provided with opposed linear flats 162 and 163 in FIG. 23. Offset from the linear flats are axially inclined flats seen at 164 and 165 for the bar 160, and 166 and 167 for the bar 161. When the bars are contra-rotated in the direction of the arrows 168 and 169, they will form an enlargement 170 in the window 172. The flats 164 through 167 are axially inclined so that they are closest to the axes of the respective bars at the midpoints thereof. In the embodiment of FIGS. 23 and 24, the window 170 may be made to gradually appear and disappear and cannot be shifted transversely across the window.

Figure 25:
FIGS. 25 and 26 are similar schematics of the similar two positions of a bar set having parabolic flats but axially inclined in the opposite direction.
Figure 26:
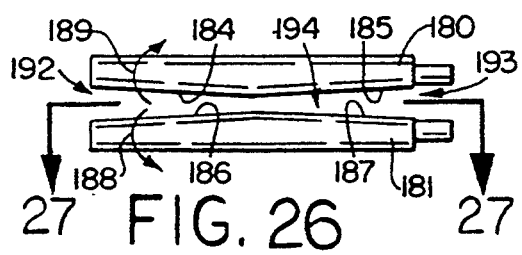
Figure 27:
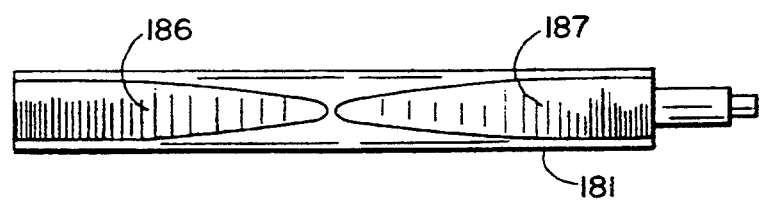
FIG. 27 is a some what top plan view of one of the bars of the set of FIG. 26 as seen from the line 27—27 thereof.

In the embodiment of FIGS. 25, 26 and 27, the bars 180 and 181 forming the window have linear flats 182 and 183 as seen in FIG. 25. Offset from those flats are inclined flats 184 and 185 for the bar 180, and 186 and 187 for the bar 181. Unlike the flats illustrated in FIG. 24, the flats of the embodiment of FIG. 26 are closest to the axis of the respective bar at the ends thereof. Such flats form the parabolic configuration seen in FIG. 27.

By contra-rotating the bars in the directions of the arrows 188 and 189, respectively, enlargements 192 and 193 may be formed at each transverse end of the window 194. By contra-rotating the bars the enlargement may be made gradually to appear and disappear. Again, they cannot be moved lengthwise of the window. However, by using the bar sets illustrated in the embodiments of FIGS. 24 and 26 in the tandem arrangement of FIG. 11, and by operating the bar sets in conjunction with each other, it will be seen that an enlargement in the center of the window may be converted to symmetrical enlargements at each end of the window. It will be appreciated that any of the various bar set flat configurations illustrated and described may be used in the tandem or single bar set arrangement. In the tandem arrangement, the bar sets may be used individually or in conjunction with each other to control the flow of melt through the die.

It can now be seen that there is provided an extrusion die which forms a rectangular window having an enlargement therein along the long side of the window, and by adjustment, that enlargement may be moved uniformly across the flow path of the extrudate. The method of the present invention provides upstream of the die lip or opening a flow path window symmetrical with the die opening, and providing an enlargement in the window, the position of which is then adjusted to control the flow through the die lip.

With the present invention, there is achieved and maintained the desired product profile without die changes or complex set up time or trial and error costs.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. An extrusion die having die lips comprising in combination a flow control upstream of the die lips and having an opening extending transversely across the flow path within the die and forming a restricted narrow rectangular window having an enlargement therein along the long side of the window, and adjustment means uniformly to move such enlargement along the long side of the window across the flow path.

2. An extrusion die as set forth in claim 1 including means to maintain the area of the enlargement as it moves along the long side of the window.

3. An extrusion die as set forth in claim 1 including means to move the enlargement from the center of the narrow rectangular window to the opposite ends symmetrically and vice versa.

4. An extrusion die as set forth in claim 1 wherein said flow control comprises an axially rotatable bar forming one side of the window.

5. An extrusion die as set forth in claim 4 wherein said bar has a helical flat thereon forming said enlargement.

6. An extrusion die as set forth in claim 5 including a second bar forming the opposite side of the window and also having a helical flat thereon forming a part of the enlargement.

7. An extrusion die as set forth in claim 6 wherein said bars are mounted for synchronous rotation wherein the respective flats cooperate with each other to form the enlargement.

8. An extrusion die as set forth in claim 7 wherein said bars are mounted for contra-rotation.

9. An extrusion die as set forth in claim 8 including a single drive for contra-rotation of the bars.

10. An extrusion die as set forth in claim 1 including a single drive for moving the enlargement.

11. An extrusion die as set forth in claim 4 including a second axially rotatable bar forming the opposite side of the window.

12. An extrusion die as set forth in claim 11 wherein said bars are paired and contra-rotated from a single point.

13. An extrusion die as set forth in claim 11 wherein the bars of said pair are mirror images of each other.

14. An extrusion die as set forth in claim 13 wherein each bar of the pair includes a helical flat.

15. An extrusion die as set forth in claim 14 wherein each helical flat turns in the opposite direction on each side of a midpoint of the bar.

16. An extrusion die as set forth in claim 13 wherein each bar of the pair includes an axially inclined flat symmetrical about the midpoint of the bar.

17. An extrusion die as set forth in claim 16 wherein the flats are closer to the axis of the bar at the ends thereof.

18. An extrusion die as set forth in claim 17 wherein the flats are closer to the axis of the bar at the midpoint thereof.

19. An extrusion die as set forth in claim 14 wherein each helical flat has a low helix angle.

20. An extrusion die as set forth in claim 19 wherein the helix angle is less than 10°.

21. An extrusion die as set forth in claim 11 wherein cylindrical grooves in the die body open to a flow path plenum within the die body, each bar being mounted in a cylindrical groove and including a linear flat which in one rotation position is flush with the plenum.

22. An extrusion die as set forth in claim 21 wherein each bar has a hollow center and an electrical heater in the hollow center.

23. An extrusion die as set forth in claim 11 including a plurality of pairs of opposed bars arranged in tandem in the flow path of the die, and means to operate each pair concurrently or individually to control the flow.

24. An extrusion die as set forth in claim 11 wherein said die includes adjustable die lips, and means to contra-rotate said bars to provide a gross flow adjustment through said die lips without adjusting said die lips.

25. An extrusion die as set forth in claim 11 including means to contra-rotate said bars through an arc of 180° or less to achieve the limits of adjustment of the flow control.

26. An extrusion die as set forth in claim 11 including means to contra-rotate said bars through an arc of 90° or less to achieve the limits of adjustment of the flow control.

27. A method of controlling the profile of an extrudate comprising the steps of forming a plastic melt, extruding the melt through a die having die lips, providing upstream of the die lips a restricted narrow elongated flow path window symmetrical with the transverse extent of the die lips, providing an enlargement in the long side of the window, and adjusting the position of the enlargement uniformly across the flow path to control the flow through the die lips.

28. A method as set forth in claim 27 including the step of maintaining the size of the enlargement uniform as it is adjusted cross the flow path.

29. A method as set forth in claim 28 including the step of adjusting the enlargement symmetrically within the range of from the center to the ends of the window and vice versa.

30. A method as set forth in claim 27 including the step of forming the enlargement along both the long edges of the window.

31. A method as set forth in claim 30 including the step of forming the enlargement symmetrically along the long edges of the window.

32. A method as set forth in claim 27 wherein at least one long edge of such window is formed by an axially rotatable bar, and rotating said bar to adjust the position of the enlargement.

33. A method as set forth in claim 32 wherein both long edges of such window are formed by an axially rotatable bar, and rotating both such bars to adjust the position of the enlargement.

34. A method as set forth in claim 32 including providing a generally helical fiat on said bar, said helical fiat forming a recess in the profile of the bar, and rotating the bar to change the position of the recess along the long edge of the window.

35. A method as set forth in claim 33 generally including providing matching helical fiats on both such bars, and rotating both bars to change the position of the recess along the long edges of the window.

36. A method as set forth in claim 35 wherein each generally helical fiat turns in the opposite direction at each end of the bar to move the enlargement uniformly and symmetrically from the center of the flow path to the edges and vice versa.

37. A method as set forth in claim 36 including the step of contra-rotating the bars uniformly from a single point adjustment to move the enlargement symmetrically.

38. A method as set forth in claim 37 including the step of rotating the bar no more than 75° about their respective axes to move the enlargement from the center to the edges and vice versa.

39. A method as set forth in claim 33 including the step of providing a plurality of pairs of bars extending transverse the flow path and arranged in tandem, and means to operate each pair individually or cooperatively to provide a gross flow adjustment for the die.

40. A method as set forth in claim 33 wherein each bar is circular in section and is recessed in a circular cylindrical recess in the die body so that the circle of the bar projects slightly into a plenum of the flow path, and providing each bar with a linear flat which in one rotational position of the bar is flush with the plenum.

41. A method as set forth in claim 33 including the step of providing a heater in each bar.

42. A method as set forth in claim 33 including the step of providing a low angle helical flat on each bar, each the mirror image of the other.

43. A method as set forth in claim 42 wherein the low angle is constant from end to end of the bar.

44. A method as set forth in claim 42 wherein the low angle helix turns in the opposite direction on each side of the midpoint of the bars.

45. A method as set forth in claim 33 wherein each bar is provided with axially inclined fiats.

46. A method as set forth in claim 45 including the step of providing a pair of such bars adjacent each other in tandem.

47. A method as set forth in claim 46 wherein said inclined fiats are symmetrical and on one pair are closer to the axis of the bars at the ends while on the other pair at the center, whereby said bars of each pair may be contra-rotated in conjunction with each other to provide a gross flow adjustment transverse the flow path.

* * * * *